United States Patent

Frantzreb, Sr. et al.

[11] 3,886,344
[45] May 27, 1975

[54] WELDING FUME EXTRACTOR

[75] Inventors: John G. Frantzreb, Sr., Peoria; Robert C. Hansen, East Peoria, both of Ill.

[73] Assignee: Caterpillar Tractor Co., Peoria, Ill.

[22] Filed: Apr. 25, 1973

[21] Appl. No.: 354,193

Related U.S. Application Data

[63] Continuation of Ser. No. 107,097, Jan. 18, 1971.

[52] U.S. Cl. .................. 219/130; 219/74; 219/136
[51] Int. Cl. .............................................. B23k 9/00
[58] Field of Search .............. 219/74, 75, 130, 136; 338/44

[56] References Cited
UNITED STATES PATENTS

| 2,310,164 | 2/1943 | Prendergast | 219/75 |
| 2,768,278 | 10/1956 | Gaines | 219/74 |
| 3,514,567 | 5/1970 | Stranl | 219/74 |

FOREIGN PATENTS OR APPLICATIONS

| 1,134,557 | 11/1968 | United Kingdom | 219/130 |
| 1,526,305 | 4/1908 | France | 219/130 |
| 234,557 | 5/1969 | U.S.S.R. | 219/230 |

OTHER PUBLICATIONS

"Fume Collecting Welding Guns," *Welding Engineer*, 10/70, pp. 43–44.

"Arc Welding of Galvanized Steel," *Welding Journal*, 8/68, pp. 644–649.

*Primary Examiner*—J. V. Truhe
*Assistant Examiner*—Clifford C. Shaw
*Attorney, Agent, or Firm*—Phillips, Moore, Weissenberger, Lempio & Strabala

[57] ABSTRACT

A welding gun is provided with an integral device for withdrawing smoke and hot gases generated during the arc welding process, including means for cooling portions of the gun that the operator normally holds during the course of his work.

15 Claims, 2 Drawing Figures

INVENTORS
JOHN G. FRANTZREB, SR.
ROBERT C. HANSEN

ATTORNEYS

WELDING FUME EXTRACTOR

This is a continuation of Ser. No. 107,097, filed Jan. 18, 1971.

BACKGROUND OF THE INVENTION

1. Field of the Invention

This invention relates to gas metal-arc and gasless metal-arc welding apparatus for fusion welding structural members. The invention relates in particular to a device for withdrawing the major portion of undesirable smoke and fumes and hot gases generated at the fusion zone while at the same time utilizing atmospheric air to cool the welding gun handle.

2. Prior Art

It has long been recognized that fumes and smoke generated in arc welding environments constitute a health problem to welders unless adequate ventilation is achieved and, additionally, the smoke generated can present a visual problem for the welders, resulting in difficulty in maintaining accuracy and quality workmanship. Many attempts have been made to improve the general ventilation system in normally isolated shop welding areas including control of open windows and doors. In some welding areas, suction fans in cooperation with adjustable flexible tubes containing a hooded open end or duct have been used near the application of the weld bead with moderate success.

In recent years, experimental work has been done in Great Britain to develop an annular withdrawal chamber surrounding the welding gun and having a vacuum applied in order to remove carbon monoxide and noxious fumes from the immediate vicinity of the welder. Further work has been undertaken in England to remove the harmful zinc oxide fumes generated while welding galvanized steel. A fume extractor has been developed in the United States using two concentric nozzles — the inner nozzle to provide the shielding gas and the outer nozzle to convey the welding fumes away from the welding area.

Such prior systems have many inherent disadvantages. For example, a general ventilation system of fume and smoke removal may work very well during warm weather, but during cold or wet weather the windows and doors may be closed by others in the building not directly connected with the welding process, adding to the discomfort of those working in the immediate area.

Independent flexible tube and duct exhaust systems require that the operator continually move the duct if the weld gun is traversed for any distance from one position to another. Additionally, if the vacuum is not in proper adjustment and if the duct is placed too close to the point of the welding application, the withdrawal of fumes from one side of the electrode may very well disturb the important shielding function of protective gases and result in defective welds.

One of the disadvantages of the fume extractor having large concentric nozzles has been that their size obstructed visibility of the weld zone.

The prior systems developed with the integrally constructed vacuum system have the disadvantage that the hot smoke and gases are drawn through a tube or passage which is integrated with the gun handle. This results in additional heating of the gun handle which normally is uncomfortably hot for the operator to hold because of the heat from the electrical cable contained within the handle, and the heat conducted to the handle area from the gun nozzle.

SUMMARY AND OBJECTIVES OF THIS INVENTION

The fume extractor of the present invention comprises a suitable smoke and hot gas intake structure surrounding the nozzle of a welding gun and connected to a vacuum system, containing a means for the aspiration of ambient air for cooling the handle as it is heated by extraneous heat sources, to isolate the handle from the smoke conduit so as to prevent handle heating from this source, and to subsequently blend this cool air with the smoke and gases, thereby limiting the temperature of the gases in the vacuum hose, pump, and treatment system.

Accordingly, an object of the present invention is to provide precise continuous smoke and gas withdrawal consistent with quality welding practices while maintaining a clean operator environment.

Another object is to provide an improved fume extractor system integral with the weld gun with a cooled handle and reasonable temperatures within the withdrawal vacuum line.

An additional object is to provide adjusting means for regulating the withdrawal rate of smoke and fumes for particular welding situations.

Other objects of this invention will become apparent from the following description and accompanying drawing.

DETAILED DESCRIPTION

Figure 1:
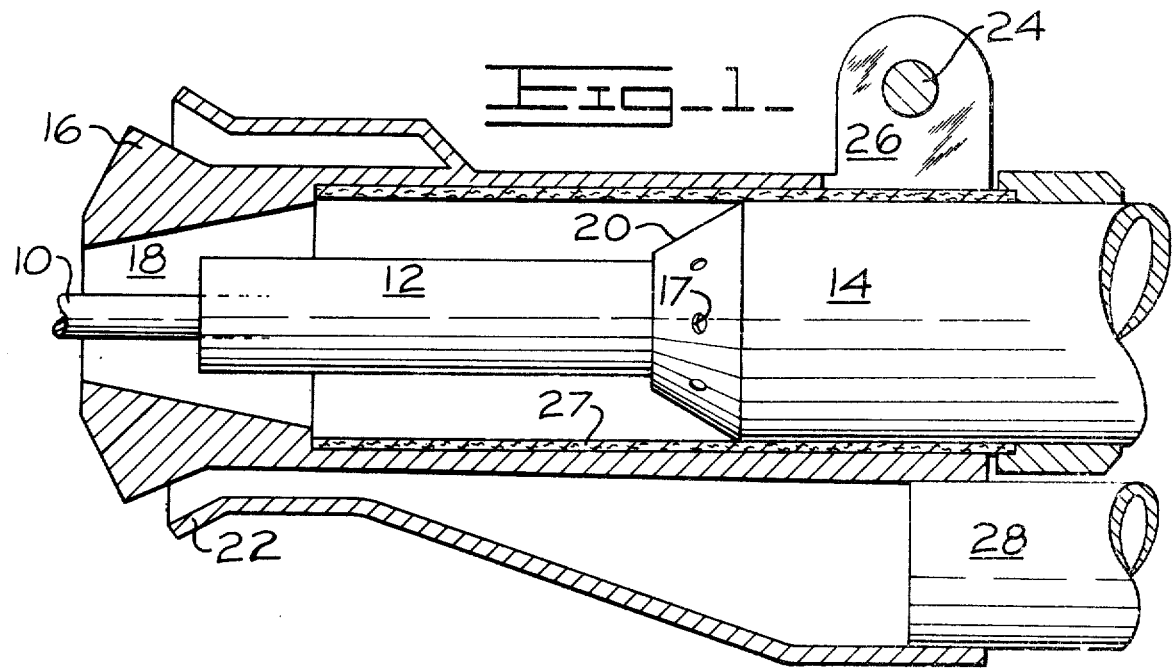
FIG. 1 is a partially sectioned side elevational view of a portion of a gas metal-arc welding gun wherein the fume extractor completely surrounds the nozzle.

Referring to FIG. 1 of the drawing, a continuous welding wire 10 is shown extending from a copper contact tip 12 forming a part of the welding gun tip 14. The weld wire is automatically advanced through the gun by conventional mechanism, not shown, to a distance beyond the gun nozzle 16 where it is exposed to and consumed in the arc between its end and the work piece to be welded.

During the gas metal arc welding process a gas such as carbon dioxide, argon or a mixture of gasses is introduced into the tapered internal chamber 18 of the nozzle 16 through a plurality of ports 17 in the tapered end 20 of the gun tip 14 in such a manner that it forms an envelope around the weld wire 10 as it is consumed in the arc, thereby preventing atmospheric contamination.

In the gasless metal-arc process the gun design and function is similar to that shown in FIG. 1 with the exception that no external protective gas is used. Protective gasses and vapors are self-generated by the flux at the arc temperature.

To the extent so far described, the welding gun and the method of gas metal-arc welding are conventional. According to the present invention, a smoke extractor pickup tube 22 is formed concentrically about the gun nozzle 16, generally following the contour thereof. In one embodiment of the smoke pickup tube, the inside diameter of the smoke pickup tube is slightly larger than the outside diameter of the gun nozzle, and an appropriate longitudinal slit through the tube is provided such that tightening of a clamping screw 24 in extended bosses 26 of the nozzle holds the tube and nozzle securely in position over an electrical insulating sleeve 27.

A smoke vacuum outlet tube 28 is fitted securely into an appropriate opening in the pickup tube 22, said outlet tube being displaced from but generally following the contour of the welding gun.

Figure 2:
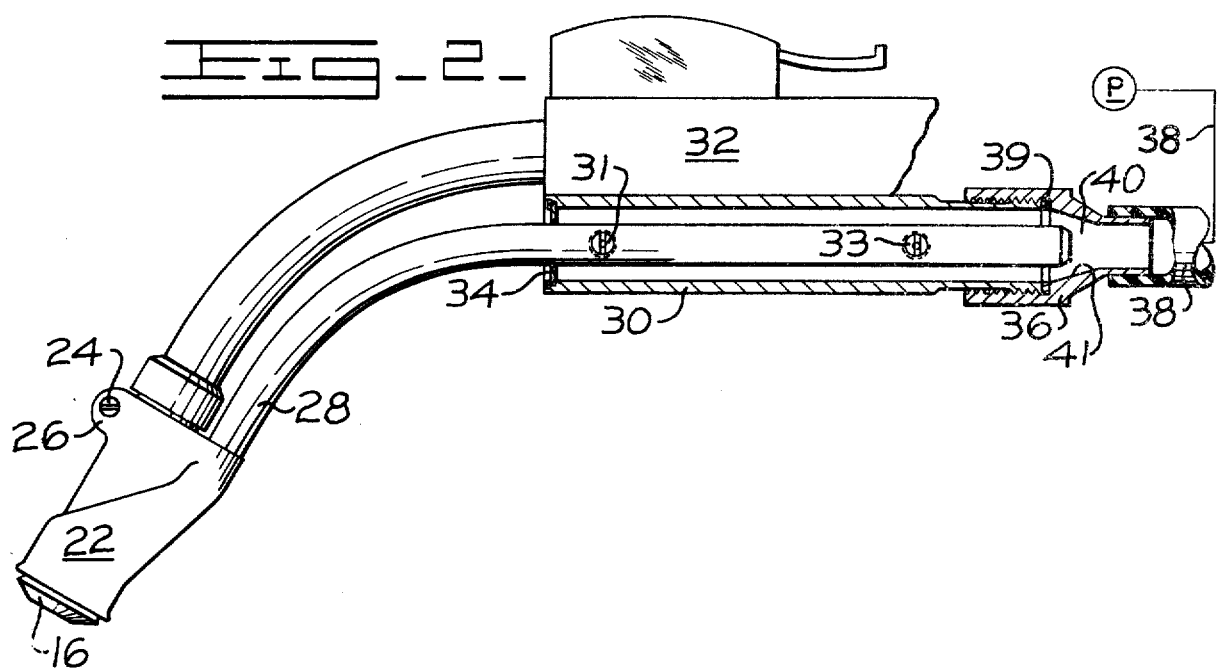
FIG. 2 is a side elevational view of the welding gun with the cooling chamber portion of the vacuum withdrawal system shown in section.

As shown in FIG. 2, the smoke outlet tube 28 has its end portion, remote from pickup 22, centrally located within an ambient air inlet tube 30 attached to the gun handle 32. Threaded fasteners 31 and 33 pass through air inlet tube 30 and engage bosses secured to the outside diameter of smoke tube 28 to maintain rigidity of the handle system. A debris screen 34 covers the inlet end of the air inlet tube 30 and tapered adapter portion 36 is attached to the outlet end, having appropriate reducing means to accomodate a length of flexible tubing 38 which in turn is attached to a vacuum pump. A spacer 39 is provided to permit adjustment of the longitudinal position at which the smoke tube 28 terminates in the adapter 36.

In operation, a vacuum is applied to the system through the tubing 38, withdrawing smoke and fumes generated at the welding arc through pickup tube 22 into the smoke outlet tube 28, and continuing into the internal conical portion 40 of the adapter 36. Simultaneously, ambient air is aspirated by the vacuum through the air inlet tube 30, and the mixing of the smoke and ambient air takes place in the internal conical portion, or blending chamber, after which the mixture is withdrawn to either a central or a local collection and is then dispensed to a point remote from the welder or other personnel, where it may be treated for removal of particulate matter.

Because of improved aerodynamic properties, it has been found that light weight nylon hose having a seamless nylon core, braided nylon reinforcement and an abrasive resistant polyurethene cover is preferred over rubber hose with its rougher interior surface. The inner tapered surface 41 is also machined to a smooth finish to reduce flow friction. A 30° included angle on both the conical portion of the blending chamber and the chamfer on the end of the smoke tube, with the end of the smoke tube extending approximately half way into the conical portion provides adequate ambient air to cool the handle and effectively removes the smoke and fumes from the gun tip area.

In a system utilizing a one-inch inside diameter ambient air inlet tube and a smoke outlet tube having a 7/16 inch outside diameter and 0.032 inch wall thickness, a total flow rate of 30 CFM results in a withdrawal rate of approximately 7.5 CFM of smoke and fumes, providing an effective combination of cooling the gun and removing the fumes. If conditions dictate a different proportion of smoke flow rate to total flow rate, the opening between the end wall of outlet tube 28 and wall 41 of tapered adapter 36 may be varied by inserting spacers 39 of any desired thickness.

With proper adjustment of the vacuum withdrawal rate, depending on specific environmental conditions, temperatures of approximately 110° F. at the handle and 150° F. in the vacuum line are achieved, and 95% of the smoke and fumes are eliminated, providing comfortable welding conditions for the operator and other employees in the area. This is accomplished without disturbing the shielding function of the protective gas.

It will be apparent that the smoke and fume withdrawal mechanism of the invention can be utilized on a gasless metal-arc welding gun in a similar manner to its use on a gas metal-arc gun.

What is claimed is:

1. In a hand-held shielded gas welding gun including an electrical contact member and an associated gun nozzle defining an opening at the forward end thereof through which shielding gas and a weld wire is fed to and contacted with said electrical member to feed electrical current into said wire and produce an arc between the end of said weld wire and a work piece with the shielding gas surrounding the same, and further including a handle forming a part of said gun remote from said nozzle; the improvement comprising a smoke and fume collecting system integral with said gun, said collecting system including a smoke and fume pickup chamber generally concentric with said nozzle and defining at least one orifice spaced apart from, generally concentric to and rearwardly of said nozzle opening; a smoke and fume extraction tube attached to and leading rearwardly coextensively from said pickup chamber to and adjacent said handle, means forming a part of said handle and providing a space surrounding a portion of said tube remote from said nozzle, and vacuum suction means connected to a remote end of said extraction tube and said means forming a space therearound for drawing smoke, and fumes into said tube and ambient air into said space surrounding said tube, respectively, for mixing the same prior to its being introduced into said collecting system.

2. The welding gun of claim 1 wherein the vacuum suction means further includes means for adjusting the relative amount of ambient air in relation to the smoke and fumes drawn into the collecting system.

3. The welding gun of claim 2 wherein said vacuum suction means comprises an opening defined by walls of said extraction tube and said means surrounding the same for controlling the admission of ambient air therein.

4. The welding fun of claim 3 wherein said opening is located within said handle.

5. The welding gun of claim 3 comprising means for varying the opening to regulate the amounts of ambient air drawn into said means surrounding said extraction tube to mix with the smoke and fumes.

6. The welding gun of claim 5 wherein said means for varying the openings comprises washers of varying thickness inserted between said ambient air passage and said extraction tube to vary the size of the opening.

7. In a welding gun of the type wherein weld wire is fed through the body of the gun and out through a gun nozzle to contact a work piece and electrical current is supplied to the gun and from thence to the weld wire to produce an arc between the end of the weld wire and the work piece, and a handle is formed into the body of said gun remote from the gun nozzle; the improvement of a smoke and fume extractor attachment comprising: a smoke and fume pickup chamber generally surrounding the welding gun nozzle and defining an open end generally concentric thereto, a smoke extraction tube opening at one end into said pickup chamber extending rearwardly and co-extensively into and adjacent said handle, means forming a part of said handle and providing a space surrounding said tube remote from said nozzle, a vacuum withdrawal system connected to the other end of said smoke extraction tube and said means surrounding the same tube remote from said gun for drawing smoke and fumes into said tube and ambient air into said space surrounding said tube, respectively for mixing the same upon their being introduced into said collecting system.

8. The welding gun of claim 7 wherein the vacuum suction means further includes means for adjusting the relative amount of ambient air in relation to the smoke and fumes drawn into the collecting system.

9. The welding gun of claim 8 wherein said means for adjusting comprises an opening defined by walls of said extraction tube and said means surrounding the same for controlling the admission of ambient air therein.

10. The welding gun of claim 9 wherein said opening is located within said handle.

11. The welding gun of claim 9 wherein said means for adjusting comprises means for varying the opening to regulate the amounts of ambient air drawn into said means surrounding said extraction tube to mix with the smoke and fumes.

12. The welding gun of claim 11 wherein said means for varying the opening comprises washers of varying thickness inserted between said ambient air passage and said extraction tube to vary the size of the opening.

13. In a hand-held light-weight welding gun for use in a welding operation during which smoke and fumes are created, and including an electrical contact member and an associated gun nozzle defining an opening at the forward end thereof through which a shielding gas passes and a weld wire is fed to and contacted with said electrical member to feed electrical current into said wire and produce an arc between the end of said weld wire and a workpiece with the shielding gas surrounding the same, and further including a thermally conductive handle forming a part of said gun remote from said nozzle and being connected to the nozzle by an arcuately curved gooseneck portion; the improvement comprising: means for cooling the handle and simultaneously collecting smoke, fumes, and shielding gas; said means comprising a collecting system including a member having a forward end adjacent to said nozzle opening defining an annular pickup chamber concentric with said nozzle and outwardly-facing orifice means spaced apart from and located rearwardly of said nozzle opening, said member including a rearward end disposed in radially offset relation to said nozzle and providing an exhaust outlet from said chamber; an extraction tube attached to said rearward end of the member in communicating relation with said exhaust outlet leading rearwardly from said pickup chamber; said extraction tube being coextensive with said gun in generally conforming relation to the arcuate underside of said gooseneck portion of the nozzle and at least a portion thereof integral with said handle and in thermal contact therewith; and vacuum suction means operatively connected to said extraction tube and having a capacity considerably greater than the volume of smoke and fumes created by the welding for also drawing ambient air into said collecting system to cool the handle, thereby drawing smoke, fumes, shielding gas and ambient air into said collecting system and simultaneously cooling the handle.

14. Apparatus as set forth in claim 13 wherein the vacuum suction means is arranged for drawing a total volume about one-fourth of which is smoke and fumes.

15. A welding gun for use in a welding operation during which smoke and fumes are created, and including: an elongated handle having front and rear ends, a nozzle disposed forwardly of the front end of the handle and having a distal end, means interconnecting the handle and nozzle, the nozzle having an axial opening at its distal end through which a weld wire is fed, and an electrical contact member associated with the nozzle and in contact with the weld wire, the improvement comprising:
a member surrounding the nozzle and spaced radially therefrom along said axis to define an annular pickup chamber concentric with the nozzle and into which smoke and fumes may be drawn;
the member having a distal end spaced rearwardly from the distal end of the nozzle along said axis;
the nozzle having an exterior work facing surface which extends divergingly upwardly outwardly between its distal end and the distal end of the member to define an outwardly-facing inlet opening to the pickup chamber spaced outwardly from and concentric to the nozzle and located rearwardly of said axial opening of the nozzle;
a longitudinal passageway formed in the handle and coextensive therewith for conducting ambient air through the handle to cool the same;
a tube communicating with the annular pickup chamber and extending therefrom to the front end of handle where it communicates with said longitudinal passageway; and
vacuum suction means operatively connected to the rear end of the longitudinal passageway and having a capacity in excess of the volume of smoke and fumes created by the welding operation for drawing ambient air along with said smoke and fumes through the longitudinal passageway in the handle thereby collecting the smoke and fumes and simultaneously cooling the handle.

* * * * *